United States Patent [19]

Lindberg et al.

[11] Patent Number: 4,792,184
[45] Date of Patent: Dec. 20, 1988

[54] CONTAINER HOLDER FOR A VEHICLE

[75] Inventors: Kenneth M. Lindberg, Holland; Ronald A. Dykstra, Rockford; Danny B. Larsen, Holland, all of Mich.

[73] Assignee: Prince Corporation, Holland, Mich.

[21] Appl. No.: 944,989

[22] Filed: Dec. 22, 1986

[51] Int. Cl.⁴ ............................................. A47C 7/62
[52] U.S. Cl. ....................................... 297/194; 297/150
[58] Field of Search ............... 297/194, 188, 149, 150; 108/25, 26, 44, 45; 248/309.1, 311.2, 313, 172; 403/84

[56] References Cited

U.S. PATENT DOCUMENTS

| | | | |
|---|---|---|---|
| 35,245 | 10/1901 | Hooper | 248/311.2 X |
| 1,155,383 | 10/1915 | Tischer | 248/172 X |
| 1,495,991 | 6/1924 | Drynan | 248/172 |
| 1,902,608 | 3/1933 | Baltzley et al. | 248/313 |
| 2,314,935 | 3/1943 | Gutterman . | |
| 2,670,124 | 2/1954 | Buchmiller et al. . | |
| 2,826,346 | 3/1958 | Randall . | |
| 2,875,940 | 3/1959 | Dunn . | |
| 2,880,951 | 4/1959 | Springer | 248/172 X |
| 3,326,445 | 6/1967 | Goings . | |
| 3,385,588 | 5/1968 | Puxkandl | 248/311.2 X |
| 3,497,076 | 2/1970 | O'Brien . | |
| 4,040,659 | 8/1977 | Arnold | 297/194 |
| 4,118,002 | 10/1978 | Bartlett | 248/311.2 |
| 4,138,055 | 2/1979 | Harrison | 248/309.1 X |
| 4,417,764 | 11/1983 | Marcus et al. | 297/194 |
| 4,521,056 | 6/1985 | Lindenmuth | 297/144 X |
| 4,599,998 | 7/1986 | Castillo | 403/84 X |

FOREIGN PATENT DOCUMENTS

| | | | |
|---|---|---|---|
| 2278244 | 2/1976 | France . | |
| 638983 | 6/1978 | France | 248/311.2 |
| 429845 | 6/1935 | United Kingdom | 248/309.1 |
| 638186 | 5/1950 | United Kingdom | 248/172 |

Primary Examiner—Kenneth J. Dorner
Assistant Examiner—José V. Chen
Attorney, Agent, or Firm—Price, Heneveld, Cooper, DeWitt & Litton

[57] ABSTRACT

A container holder for a vehicle is stored in an armrest and can be moved to a use position exposing a container supporting element. The container supporting element includes an aperture with adjustable dimensions for holding different sized containers. The aperture may include inwardly projecting resilient or pivoted sectors. In one embodiment the aperture is defined by spaced vertically extending rods which pivot toward and away from each other to provide support for different sized containers.

4 Claims, 3 Drawing Sheets

CONTAINER HOLDER FOR A VEHICLE

BACKGROUND OF THE INVENTION

The present invention relates to holders for a container and particularly to one for use in connection with a vehicle and more particularly an armrest within a vehicle.

There exists a variety of cup holders or container holders utilized for supporting cups, cans and other beverage containers in a vehicle such that the vehicle occupants can support such beverages while in the vehicle. U.S. Pat. No. 4,417,764 issued Nov. 29, 1983 is representative of one cup holder structure which is incorporated in the armrest of a vehicle and which can accommodate such containers. U.S. Pat. No. 3,326,445 discloses a disposable container holder for use on a car seat. U.S. Pat. Nos. 3,497,076 and 4,040,659 also disclose cup holders which move from a storage position within a support structure in an automobile to a use position.

Although these various cup holders are useful for single or limited sized containers, the system of the present invention is adapted to accommodate a variety of beverage containers such as cans, coffee mugs, large cups and the like.

SUMMARY OF THE PRESENT INVENTION

Container holders embodying the present invention includes a support structure within a vehicle for the holder and a holder movably mounted within the support for movement between stored and use positions. The holder includes a container supporting element extending in a generally horizontal plane when in a use position with the element including means defining an aperture of adjustable dimensions for engaging the sidewalls of a beverage container.

In one embodiment of the invention, the means for defining an aperture comprises a plurality of resilient members extending inwardly from an edge of an aperture formed in the horizontal support element. In another embodiment of the invention, sections are pivotally mounted to an edge of an aperture in the support element and bias means are provided for urging them toward a position tending to close the aperture such that they engage a container inserted therein. In yet another embodiment of the present invention, the means defining the adjustable diameter aperture comprise a plurality of space vertically extending rods pivotally mounted to the support element for movement toward and away from each other to grip the sidewalls of different sized containers. In a preferred embodiment of the invention, the cup holder is mounted within an armrest of a vehicle and can be pivoted or otherwise movably mounted thereto between a stored position within the armrest and a use position extended from the armrest.

These and other features, objects and advantages of the present invention will become apparent upon reading the following description thereof together with reference to the accompanying drawings in which:

DETAILED DESCRIPTION OF THE PREFERRED EMBODIMENT

Figure 1:
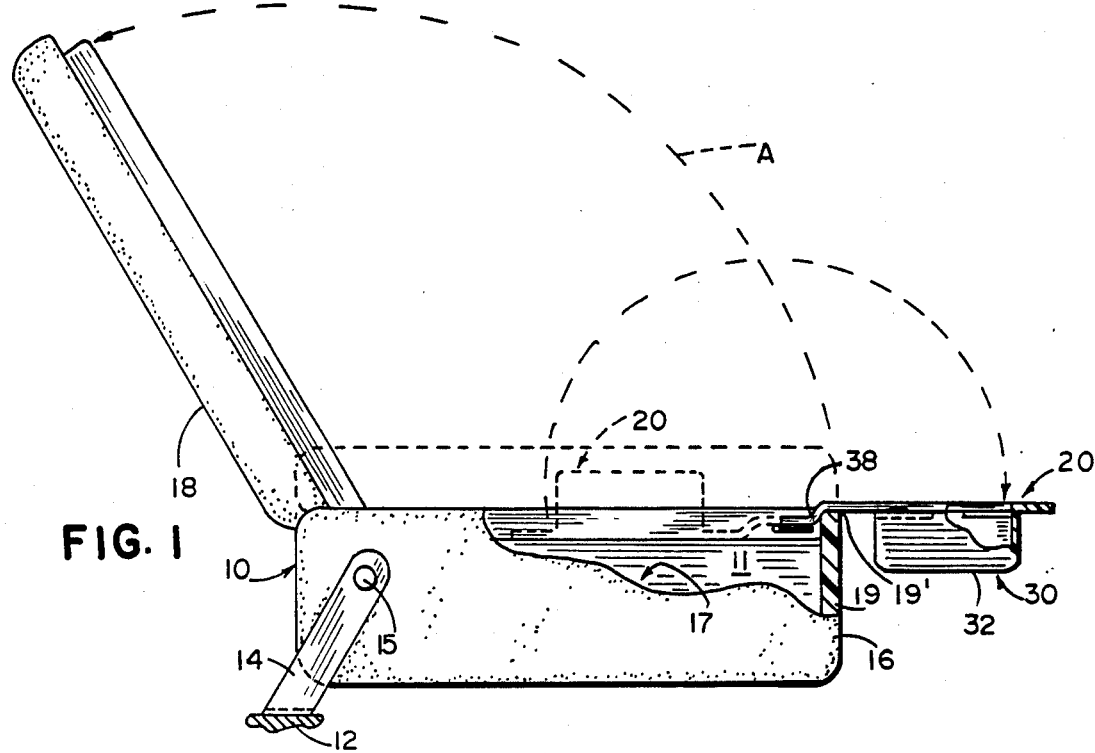
FIG. 1. is a right side elevational view of an armrest incorporating a container supporting member according to one embodiment of the present invention shown partly in cross-section and partly in phantom form.

Referring initially to FIG. 1 there is shown an armrest 10 which is secured to a vehicle 12 by one or more suitable mounting brackets 14. In the embodiment shown, bracket 14 pivotally mounts the armrest to the vehicle through pivot mounting member 15 such that the entire armrest can be lowered for use as shown, or raised for storage. The armrest 10 includes a lower storage housing 16 which defines an interior storage compartment 17. The armrest also includes a cover 88 which is pivoted along its rear edge to the rear of housing 16 such that it can be moved between a closed position shown in phantom form in FIG. 1 and an open position shown in solid form in FIG. 1 by pivoting in a direction indicated by arrow A. Pivotally mounted to the forward edge of the inside of compartment 17 near the front wall 19 of the housing 16 is a container holder 20 embodying the present invention.

The container holder 20 comprises a generally planar container supporting element 22 having a central circular aperture 24 extending downwardly therethrough and having a diameter slightly larger then the diameter of the largest container desired to be held therein. The support element 22 integrally includes in the preferred embodiment four arcuate sector shaped resilient cup support members 21, 23, 25 and 27 which are equally spaced around the periphery of aperture 24 and which project partially inwardly toward the center of the aperture. In the preferred embodiment, the thickness of members 21, 23, 25 and 27 is substantially thinner than that of the support element 22 to provide, in effect, resilient flaps which will easily deflect under the influence of the downward pressure of a container. Support element 22 also includes in the preferred embodiment a cup shaped floor support 30 as best seen in FIG. 1 which includes a circular floor 32 for supporting the bottom of a container while the resilient flaps support the sidewalls at equally spaced intervals. When containers are positioned in holder 20, the sidewalls are supported by the inner lips 26 of the segments 21, 23, 25 and 27 in spaced relationship around the periphery of the container and in vertical spaced relationship to the floor support 32. This stabilizes the container when inserted into the holder and yet the resilient segments allow easy removal of the container.

Figure 2:
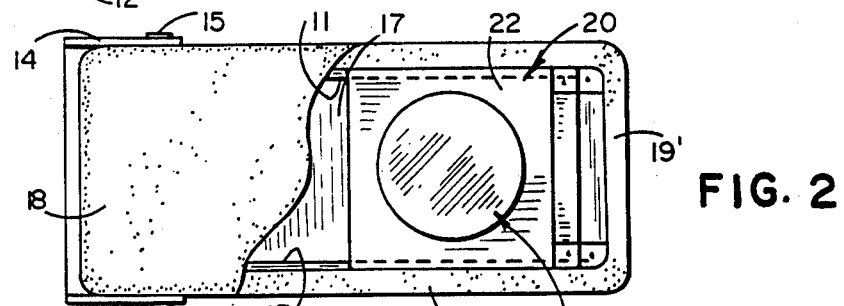
FIG. 2. is a top plan view of the structure shown in FIG. 1 partly broken away to show the container support member in the stored position.
Figure 3:
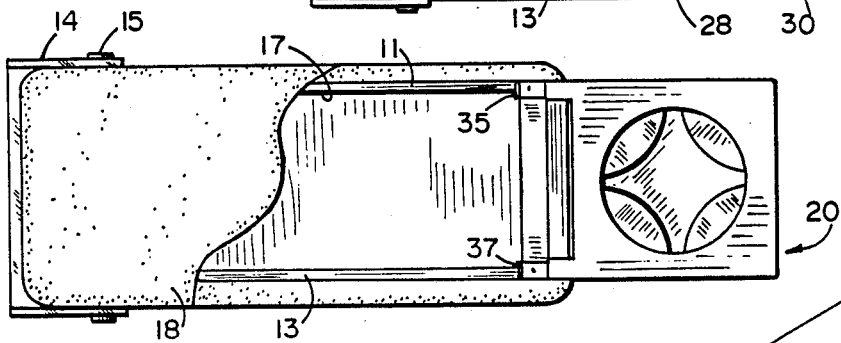
FIG. 3. is a top plan view partly broken away of the structure shown in FIG. 2 showing the container support member in an extended use position.
Figure 4:
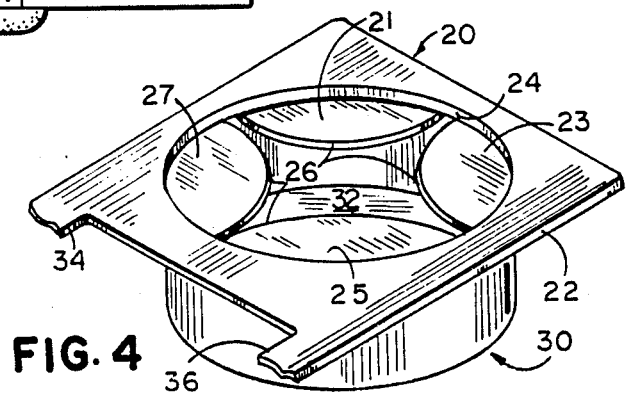
FIG. 4. is an enlarged fragmentary perspective view of the container support member.

Element 22 includes a pair of rearwardly projecting arms 34 and 66 which are pivotally coupled by pivot pins 35 and 37, respectively to the sidewalls 11 and 13 of housing 16. Thus, the holder 20 can be pivoted to a stored position shown in FIG. 2 and in phantom form in FIG. 1 and concealed by the cover 18 of armrest assembly 10 or pointed outwardly to a horizontally extending use position as illustrated in FIGS. 1 and 3 for receiving a container. In the stored position, the edges of the rectangular element 22 are supported on the tops of sidewalls 11 and 13 which are covered by a suitable padded upholstery material 28 to conform the armrest to the vehicle's interior. In the use position typically the cover 18 of the armrest will be closed and the rearwardly extending arms 34 and 36 include a "S" shaped curved section 38 as best seen in FIG. 1 to conceal the pivot connections 35 and 37 within the housing 16 and allow the arms to be supported on the top lip 19' of the front wall 19 of housing 16 as best seen in FIG. 1.

The cup holder 20 is integrally formed of a suitable polymeric material such as expanded polyvinyl chloride and can be molded as a single piece including the pivot rods 35 and 37. Legs 34 and 36 are sufficiently resilient to allow the legs to be inwardly deflected for snap fitting them into apertures formed in walls 11 and 13 of housing 16. In place of the resilient container engaging segments 21, 23, 25 and 27, segments can be pivotally coupled to the support element 22 as seen in the alternative embodiment shown in FIGS. 5-7 now described.

Figure 5:
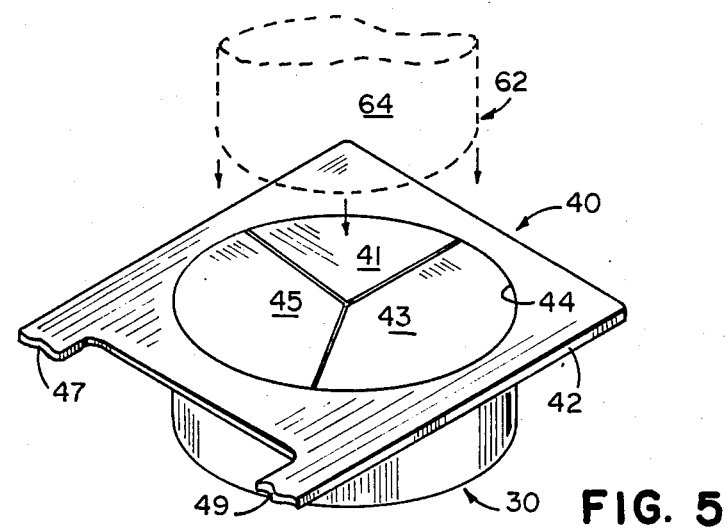
FIG. 5. is a fragmentary perspective view of an alternative embodiment of the container support member.
Figure 6:
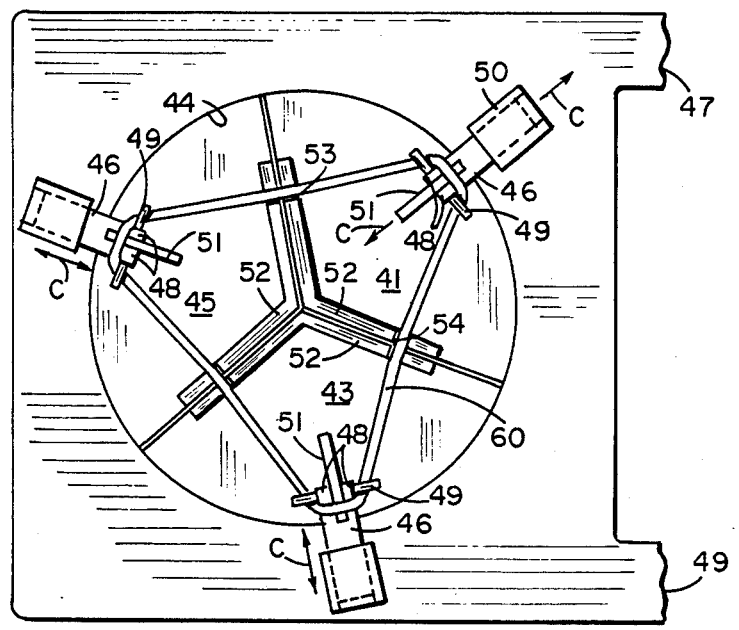
FIG. 6. is an enlarged bottom plan view of the upper portion of the structure shown in FIG. 5.
Figure 7:
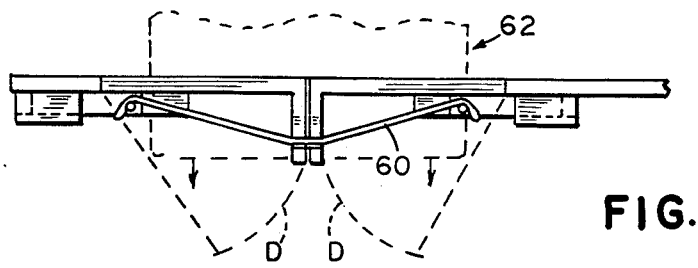
FIG. 7. is a side elevational view of the structure shown in FIG. 6 taken in the direction of arrow VII in FIG. 6.

The cup holder 40 shown in this embodiment also includes a horizontally extending support element 42 having a circular aperture 44 formed therein. In place of the resilient polymeric sectors, however, three approximately 120° sectors 41, 43 and 45 selectively enclose the aperture 44. Sectors 41, 43 and 45 when in the enclosed position shown in FIG. 5, are substantially co-planar with member 42. The sectors are pivotally and slidably attached to the underside of member 42 as best seen in FIGS. 6 and 7 in which the underlying cup shaped support member 30, substantially the same as that shown in the first embodiment, is removed for clearly showing the mounting structure for the sectors.

Each of the sectors include a mounting boss 51 to which a slide 46 is pivotally attached. The slides are approximately in the center of the outer curved edge of each sector as shown in FIG. 6 and each includes a bifurcated end having tines 48 with an aperture therethrough for receiving a pivot rod 49. Each of these slides 46 extends through a generally "U" shaped guide member 50 mounted to the lower surface of member 42 adjacent aperture 44 such that the slides 46 can move inwardly and outwardly as indicated by arrows "C" in FIG. 6. Along the straight intersecting edges of each of the arcuate segment-shaped members 41, 43 and 45 there is provided a downwardly extending leg 52 which extends along a substantial portion of each of the linear edges of the segments. Each of the legs 52 include a slot 53 near one end and a second slot 54 near the other end and are aligned with similar slots formed in adjacent legs to permit a bias member 60 to extend therein as seen in FIGS. 6 and 7. The bias member 60 can be an elastic member such as a rubberband or the like which extends under and is captively held by each of the pivot pins 49 and as best seen in FIG. 7 urges the segments 41, 43 and 45 upwardly to a substantial co-planar position. When a beverage container 62 is pushed downwardly otto the deflectable surface defined by members 41, 43 and 45, these members swing downwardly as illustrated by the phantom lines in FIG. 7 and by arrows "D" to selectively open the holder for receiving the beverage container. The diameter of the opening so formed conforms to the edge of sidewall 64 of the typically cylindrical container.

As the segments 41, 43, and 45 pivot downwardly, the bias means 60 tends to urge the members inwardly towards the sides of the container until the container bottoms seat against the floor of cup shape member 30 with the segments 41, 43 and 45 being in a general vertical position and held against the container sidewall by bias member 60. The slides 46 thus are sufficiently long to accommodate such pivoted movement which thus allows the cup holder to contain a wide variety of containers having different diameters. As with member 20, member 40 similarly includes a pair of legs 47 and 49 which as in the first embodiment are pivotally mounted to a support member in the vehicle and preferably in an armrest such as armrest 10. The cup shaped member 30 has a depth sufficient to allow the sectors 41, 43 and 45 to pivot downwardly to a vertical position and in the preferred embodiment was a depth of approximately 3 inches.

As with the embodiment shown in FIGS. 1-4, member 40 can be integrally molded of a polymeric material such as A.B.S. or Styrene to include the guides 50 and each of the identical sectors 41 43, and 45 can similarly be integrally molded including the mounting bosses 51 which extend between the tines 48 of the slides 46 and include an aperture for receiving pivot pin 49. The holder is assembled by assembling each of the slides 46 onto a mounting boss 51 with a pivot pin 49, positioning each of the segments into the associated slide receiving members 50 and subsequently coupling the bias member 60 around each of the slide members such as by looping the member over the ends of the pivot axle 49 which extends beyond the width of tines 48 or by other suitable fastening means such as a notch or the like against each of the slides 46 or directly onto the mounting block 51 if desired. The bias means thus provides both an upward urging force to return the sectors to their original positions shown in FIG. 5 when the container is removed as well as a lateral force for the sectors against the sidewall of the container. The remaining embodiments of the present invention, which likewise provides an adjustable diameter cylindrical support aperture for a beverage container, is shown in FIGS. 8-10.

Figure 8:
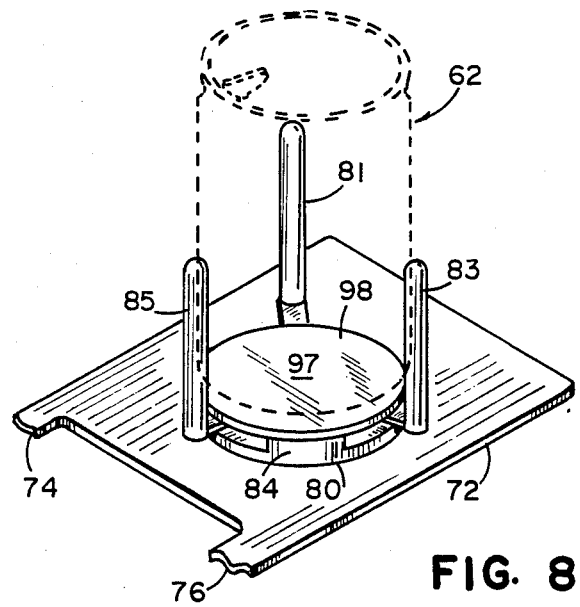
FIG. 8. is fragmentary perspective view of an alternative embodiment of the present invention.
Figure 9:
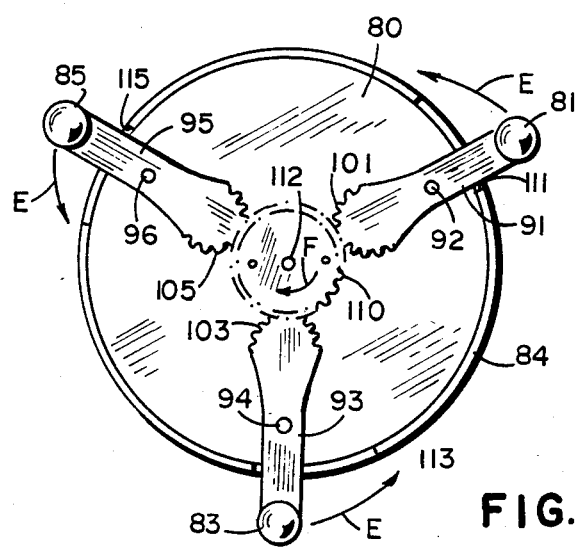
FIG. 9. is a top plan view of the structure shown in FIG. 8. shown with the cover removed.
Figure 10:
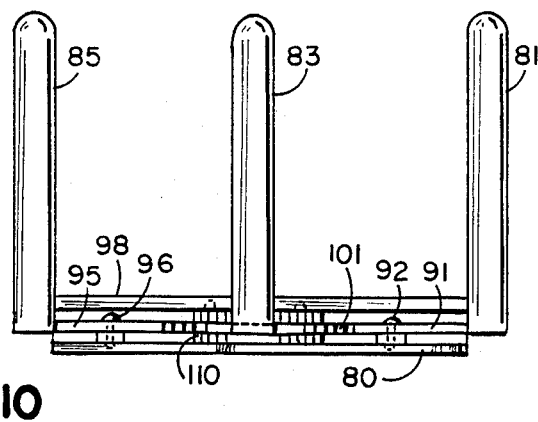
FIG. 10. is a side elevational view of the structure shown in FIG. 8.

In FIGS. 8-10 the holder includes a support platform 72 with legs 74 and 76 which are pivotally secured to the armrest 10 as in the first and second embodiments. The platform supports thereon a generally disc-shaped base member 80 which is centrally located and secured to the generally rectangular planar member 72 by suitable fastening means such as a bonding adhesive. Member 72 supports three generally vertically extending horizontally pivoted rods 81, 83 and 85 which like sectors 41, 43 and 45 and segments 21, 23, 25 and 27, move inwardly and outwardly from the center of the disc-shaped member 80 to define a larger or smaller diameter opening for receiving a container such as a beverage can 62 shown in phantom lines in FIG. 8. Each of the rods 81, 83 and 85 are rounded at their upper end as best seen in FIG. 10 and are coupled at their opposite ends to pivot arms 91, 93 and 95 as best seen in FIG. 9.

Each of the arms 91, 93 and 95 are pivotally mounted near their mid-point to disc 80 by means of a pivot pin 92, 94 and 96, respectively and each include a toothed end 101, 103 and 105, respectively for meshing with a central idler gear 110 pivotally mounted by pin 112 to disc 80. Each of the arms extend through slots 111, 113, 115 formed in the circular sidewall 84 of disc 80. An inverted cup-shaped cap 98 encloses the gear 110 and inner ends of arms 91, 93 and 95 as seen in FIGS. 8 and 10. Each of the pivot arms and their associated vertically extending rods can be integrally molded of a suitable polymeric material such as A.B.S. As can be seen particularly with reference to FIG. 9, the rods 81, 83 and 85 are positioned a predetermined distance from the center of disc 80 represented by pin 112 and as one arm is physically pivoted in a counterclockwise direction as indicated by arrows "E" in the Fig., it rotates the gear 110 in a direction indicated by arrow "F" which in turn rotates each of the remaining arms in the direction indicated by arrows "E" to simultaneously move all of the arms closer to the center 112 of the disc thereby reducing the diameter of the opening defined by the rods.

The holder is used by typically leaving the rods in their openmost position as illustrated in FIG. 9 and placing a container thereon on the upper support surface 97 of inverted cup shape member 98. Next the user grasps one of the upstanding rods 81, 83 and 85 and pivots it until the rods engage the sidewall of the container. The pivot pin 112 associated with gear 110 frictionally engages the gear to allow it to rotate with some resistance such that the rods will remain in an adjusted position and the container can subsequently be removed and reinserted without readjustment of the supporting rods. The locus of points of the rod tips in any adjusted position define a circle and when moved the circle has a greater or lesser diameter to conform to the outer diameter of the beverage container 62. Naturally, if desired, more than three rods can be incorporated by adjusting the spacing so that they are an equal distance around the perimeter of the support disc 83. Like the remaining embodiments, member 72 is pivotally mounted within a vehicle support member such as an armrest 10 as shown in FIG. 1.

In each of the embodiments, a container holder is provided with a variable diameter aperture for engaging the sidewalls of a container to securely hold the container in position and yet allow its easy removal. In the preferred embodiment of the invention, the holder is particularly well adapted for mounting to a vehicle armrest to pivot from a stored position enclosed within the armrest to a use position which extends from the armrest for supporting a beverage container.

It will become apparent to those skilled in the art that various modifications to the preferred embodiment can be made without departing from the spirit or scope thereof as defined by the appended claims.

The embodiments of the invention in which an exclusive property or privilege is claimed are defined as follows:

1. A vehicle armrest and container holder assembly comprising:

an armrest for mounting to a vehicle said armrest including a storage housing;

a container holder including a container supporting element extending in a generally horizontal plane for use, said element including means defining an aperture of adjustable dimensions for engaging the sidewalls of a beverage container wherein said means defining an aperture comprises an aperture formed through said element and a plurality of sector-shaped members pivotally mounted to said element and bias means for urging said sector-shaped members toward a position tending to enclose said aperture, said when a container is inserted into said aperture, said sector-shaped members engage the side of the container for removably holding the container; and means for mounting said container supporting element to said housing for movement between a stored position at least partially within said housing and a use position extended from said housing and further including slide means extending between each of said sectors and said element for coupling each of said sector-shaped members to said element.

2. The apparatus as defined in claim 1 wherein said slide means includes pin means and said bias means comprises a continuous elastic loop extending around said pin means of each of said slides and in an elastically deformed condition for urging said sectors toward position co-planar with said element.

3. A vehicle armrest and container holder assembly comprising:

an armrest for mounting to a vehicle said armrest including a storage housing;

a container holder including a container supporting element extending in a generally horizontal plane for use, said element including means defining an aperture of adjustable dimensions extending vertically with respect to said element for engaging the sidewalls of a beverage container extending vertically downwardly through said aperture wherein said means defining an aperture comprises a plurality of spaced vertically extending rod means pivotally mounted to said supporting element for movement toward and away from each other for supporting different sized containers therein and wherein said supporting element includes a disc-shaped base, an idler gear centrally rotatably mounted to said base and wherein said rod means are coupled to one end of a pivot arm and wherein each of said pivot arms include gear means at an end remote from said rod means, and wherein said pivot arms are pivotally mounted to said base such that said gear means of each pivot arm engages said idler gear at spaced positions thereon such that said arms move in a synchronous manner; and means for mounting said container supporting element to said housing for movement between a stored position at least partially within said housing and a use position extended from said housing.

4. The apparatus as defined in claim 3 and further including a cover positioned over said idler gear for supporting the floor of a container.

* * * * *

UNITED STATES PATENT AND TRADEMARK OFFICE
CERTIFICATE OF CORRECTION

PATENT NO. : 4,792,184

DATED : December 20, 1988

INVENTOR(S) : Lindberg et al

It is certified that error appears in the above-identified patent and that said Letters Patent is hereby corrected as shown below:

Column 1, line 49:
    "comprise" should be --comprises--
Column 1, line 50:
    "space" should be --spaced--
Column 2, line 33:
    "cover 88" should be --cover 18--
Column 3, line 7:
    "pointed" should be --pivoted--
Column 3, line 66:
    "otto" should be --onto--
Column 4, line 9:
    "shape" should be --shaped--
Column 5, line 22:
    "shape" should be --shaped--
Column 6, claim 1, line 9:
    "said" second occurrence should be --wherein--
Column 6, claim 2, line 26:
    After "toward" insert --a--.

Signed and Sealed this

Fourth Day of July, 1989

Attest:

DONALD J. QUIGG

Attesting Officer

Commissioner of Patents and Trademarks